US 6,718,599 B2

(12) United States Patent
Dickinson et al.

(10) Patent No.: US 6,718,599 B2
(45) Date of Patent: Apr. 13, 2004

(54) SPRING FASTENER WITH ERGONOMICALLY BALANCED REMOVAL TO INSERTION FORCE RATIO

(75) Inventors: Daniel James Dickinson, Arlington Heights, IL (US); Michael Walter Smith, Lake Zurich, IL (US); Lawrence John Conway, Des Plaines, IL (US); Edward Sacha, Chicago, IL (US); Paul Lester Clemens, Lake Zurich, IL (US); Mark Fleydervish, Buffalo Grove, IL (US); Richard H. Ducato, Kenosha, WI (US); Eustathios Vassiliou, Newark, DE (US)

(73) Assignee: Termax Corporation, Schaumburg, IL (US)

( * ) Notice: Subject to any disclaimer, the term of this patent is extended or adjusted under 35 U.S.C. 154(b) by 0 days.

(21) Appl. No.: 10/164,963

(22) Filed: Jun. 7, 2002

(65) Prior Publication Data

US 2002/0194710 A1 Dec. 26, 2002

Related U.S. Application Data

(60) Provisional application No. 60/301,364, filed on Jun. 25, 2001, provisional application No. 60/327,815, filed on Oct. 9, 2001, and provisional application No. 60/353,515, filed on Feb. 1, 2002.

(51) Int. Cl.[7] .......................... A44B 17/00; F16B 13/06; F16B 19/00
(52) U.S. Cl. ............................ 24/295; 24/289; 24/293; 24/458; 24/517; 411/508
(58) Field of Search .................... 24/295, 289, 293, 24/458, 517, 297, 662; 411/508, 509, 510; 52/718.01; 296/201

(56) References Cited

U.S. PATENT DOCUMENTS

| 2,322,656 | A | | 6/1943 | Murphy ........................ 24/73 |
|---|---|---|---|---|
| 2,329,688 | A | | 9/1943 | Bedford, Jr. .................. 189/88 |
| 2,424,757 | A | | 7/1947 | Klumpp ...................... 174/153 |
| 2,542,883 | A | | 2/1951 | Tinnerman ................... 24/259 |
| 2,607,971 | A | | 8/1952 | Bedford, Jr. .................. 24/73 |
| 2,825,948 | A | | 3/1958 | Parkin ........................... 24/73 |
| 3,525,129 | A | | 8/1970 | Holton ........................ 248/188 |
| 3,673,643 | A | | 7/1972 | Kindell ....................... 24/73 B |
| 3,864,789 | A | | 2/1975 | Leitner ...................... 24/73 MF |
| 4,133,246 | A | | 1/1979 | Small ............................ 85/80 |
| 4,245,652 | A | | 1/1981 | Kelly et al. ................. 128/736 |
| 4,431,355 | A | | 2/1984 | Junemann ...................... 411/15 |
| 4,595,325 | A | | 6/1986 | Moran et al. ................ 411/173 |
| 4,609,170 | A | | 9/1986 | Schnabl ....................... 248/71 |
| 4,683,622 | A | | 8/1987 | Oehlke ......................... 24/458 |
| 4,701,984 | A | * | 10/1987 | Wyckoff ....................... 24/297 |
| 4,712,341 | A | | 12/1987 | Harris, Jr. et al. ............ 52/208 |
| 4,792,475 | A | | 12/1988 | Bien .......................... 428/137 |
| 4,981,310 | A | | 1/1991 | Belisaire ..................... 285/162 |
| 5,092,550 | A | | 3/1992 | Bettini ....................... 248/188 |

(List continued on next page.)

Primary Examiner—Victor Sakran
(74) Attorney, Agent, or Firm—E. Vassiliou (57) ABSTRACT

This invention relates to a spring fastener, which comprises engagement springs in opposite sides of the fastener. Each engagement spring has an engagement region comprising a hindrance portion, which increases considerably the removal to insertion force ratio as compared to such ratio in the absence of the hindrance portion, thus permitting very easy insertion with considerably more difficult removal of the fastener from the slot of a panel, which provides an efficient ergonomically balanced removal to insertion force ratio. The hindrance portion comprises ripples or other hindrance elements of unexpectedly minute dimensions for providing this efficient ergonomic force balance.

35 Claims, 7 Drawing Sheets

U.S. PATENT DOCUMENTS

| | | | |
|---|---|---|---|
| 5,095,592 A | 3/1992 | Doerfling | 24/295 |
| 5,129,768 A | 7/1992 | Hoyle et al. | 411/182 |
| 5,367,751 A | 11/1994 | DeWitt | 24/295 |
| 5,373,611 A | 12/1994 | Murata | 24/297 |
| 5,442,789 A | 8/1995 | Fisher et al. | 361/719 |
| 5,542,158 A | 8/1996 | Gronau et al. | 24/295 |
| 5,887,319 A | 3/1999 | Smith | 24/293 |
| 5,919,019 A | 7/1999 | Fisher | 411/182 |
| 5,987,714 A | 11/1999 | Smith | 24/295 |
| 6,074,150 A * | 6/2000 | Shinozaki et al. | 411/508 |
| 6,141,837 A | 11/2000 | Wisniewski | 24/295 |
| 6,203,240 B1 | 3/2001 | Hironaka et al. | 403/397 |
| 6,353,981 B1 * | 3/2002 | Smith | 24/295 |
| 6,381,811 B2 * | 5/2002 | Smith et al. | 24/289 |

* cited by examiner

SPRING FASTENER WITH ERGONOMICALLY BALANCED REMOVAL TO INSERTION FORCE RATIO

RELATED APPLICATIONS

This application claims priority of provisional patent application Nos. 60/301,364, filed Jun. 25, 2001, 60/327,815, filed Oct. 9, 2001, and 60/353,515, filed Feb. 1, 2002, all three of which are incorporated herein by reference in their entirety.

FIELD OF THE INVENTION

This invention relates to spring fasteners characterized by a structure having a cavity in which an extension or rib of a first part, such as a plastic panel for example, may be engaged, and they are also suitable to be engaged reversibly in a slot of second part, such as a metal sheet or the frame of a car for example. The invention also pertains an assembly of the first and the second part as connected to each other through the fastener, as well as vehicles comprising such assemblies.

BACKGROUND OF THE INVENTION

A number of fasteners have been used in the past for securing one object on another object, as for example, securing an article such as for example a plastic sheet on a metal or other rigid plastic sheet. However, the fasteners of the type, which are improved by the advances of the present invention, and being used presently, have a rather low ratio of insertion force to removal force. In other words, they require considerable force to be inserted into a slot in order to provide adequate removal resistance in order to be removed from the slot. This is ergonomically inferior performance, and the operators may suffer miscellaneous ailments, while productivity is also considerably undermined.

Examples of conventional fasteners are disclosed in U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,919,019 (Fisher) provides fasteners which can only be permanently installed into a slot; they can only be inserted but not extracted without damage to parts of the fastener. The major engagement is performed by spring strips, while frictional portions of the fastener pass through the slot with at most slight compression, and immediately after the insertion of the fastener they are located in slightly spaced or barely contacting relation with the edges of the slot. They are only activated for engagement after the insertion of a bolt into a hole at the base plate. Thus, the profound effect of the increased removal to insertion ratio (explained in detail hereinbelow) is not recognized, mentioned, or implied. Thus, the intentionally provided distance of the frictional portions away from the edges of the slot by Fisher, during insertion and before use of the bolt, teaches actually away from the instant invention, which recognizes and takes full advantage of the increased removal to insertion ratio by an engagement region having a hindrance portion. As a matter of fact, if the engagement surfaces of the instant invention were located in slightly spaced or barely contacting relation with the edges of the slot, no engagement at all would take place upon insertion of the fastener of this invention into the slot.

U.S. Pat. No. 6,141,837 (Wisniewski) describes a spring fastener comprising bulbous and outwardly projecting portions, which assist in preventing withdrawal of the clip and associated molding from an aperture of a vehicle frame. However, "bulbous projections" are necessarily voluminous, take most of the space between the "reverse bents", and unless they are manufactured within tight tolerances with regard to the thickness of the frame, the "base plates" do not sit on the frame (see also the Figures), rendering the structure unstable.

U.S. Pat. Nos. 6,203,240 B1 (Hironaka et al.), 5,129,768 (Hoyle et al.), 5,092,550 (Bettini), 4,981,310 (Belissaire), 4,712,341 (Harris, Jr. et al.), 4,595,325 (Moran et al.), 4,431,355 (Junemann), 4,133,246 (Small), and 2,424,757 (F. Klump, Jr.) are directed to plastic or metal fasteners which are designed to be just inserted into the slot of a panel, but not extracted without damage to the fastener (if such extraction would be attempted from the front side; the side from which the fastener is inserted into the panel, since the back part of the panel is not reachable in the cases, wherein such types of fasteners are used).

SUMMARY OF THE INVENTION

As aforementioned, this invention relates to spring fasteners characterized by a structure having a cavity in which the rib of a first part, such as a plastic panel for example, may be engaged, and they are also suitable to be engaged reversibly in a slot of second part, such as a metal sheet or the frame of a car for example. The invention also pertains an assembly of the first and the second part as connected to each other through the fastener, as well as vehicles comprising such assemblies.

More particularly, the invention pertains a spring fastener comprising a first side and a second side opposite the first side, the first side connected to the second side thereby forming a U-shaped structure having a cavity between the first side and the second side, a bottom portion wherein the first side and the second side are connected, and a top portion, the first side comprising first barbs having first front ends, and a first engagement spring, the first engagement spring connected to the first side in the vicinity of the bottom portion, the second side comprising second barbs second front ends, and a second engagement spring, the second engagement spring connected to the second side in the vicinity of the bottom portion, each of the first and second engagement springs having a recess and a free end in the vicinity of the top portion, each spring also comprising a peak and an engagement region with a hindrance portion between the recess and the peak, the hindrance portion providing increased removal force, when the fastener is pulled by a rib of a first part engaged to the first and second barbs, after the fastener has been inserted into a slot of a second part, the slot having a slot width and edges on which edges the engagement region is engaged, the increased removal force being due to the hindrance portion, and wherein the fastener can be extracted when pulled by the rib without damage to said fastener.

This invention further pertains an assembly comprising:
a spring fastener comprising a first side and a second side opposite the first side, the first side connected to the second side thereby forming a U-shaped structure having a cavity between the first side and the second side, a bottom portion wherein the first side and the second side are connected, and a top portion, the first side comprising first barbs having first front ends, and a first engagement spring, the first engagement spring connected to the first side in the vicinity of the bottom portion, the second side comprising second barbs second front ends, and a second engagement spring, the second engagement spring connected to the second side in the vicinity of the bottom portion, each of the first and second engagement springs having a recess and a free end in the vicinity of the top portion, each spring also comprising a peak and an engagement region with a hindrance portion between the recess and the peak;

a first part comprising a rib inserted into the cavity of the spring fastener and engaged to the first and second barbs; and a second part comprising a slot, the slot having a width and edges, the fastener being disposed in the slot in a manner that the edges of said slot are engaged to the engagement regions of the spring fastener;

with the requirement that by pulling the rib, the fastener is extracted from the slot without damage to the fastener, and with a higher force than a force required in the absence of the hindrance portion.

In addition, this invention is related to a vehicle which comprises an assembly, the assembly comprising vehicle comprising an assembly, the assembly comprising:

a spring fastener comprising a first side and a second side opposite the first side, the first side connected to the second side thereby forming a U-shaped structure having a cavity between the first side and the second side, a bottom portion wherein the first side and the second side are connected, and a top portion, the first side comprising first barbs having first front ends, and a first engagement spring, the first engagement spring connected to the first side in the vicinity of the bottom portion, the second side comprising second barbs second front ends, and a second engagement spring, the second engagement spring connected to the second side in the vicinity of the bottom portion, each of the first and second engagement springs having a recess and a free end in the vicinity of the top portion, each spring also comprising a peak and an engagement region with a hindrance portion between the recess and the peak;

a first part comprising a rib inserted into the cavity of the spring fastener and engaged to the first and second barbs; and a second part comprising a slot, the slot having a width and edges, the fastener being disposed in the slot in a manner that the edges of said slot are engaged to the engagement regions of the spring fastener;

with the requirement that by pulling the rib, the fastener is extracted from the slot without damage to the fastener, and with a higher force than a force required in the absence of the hindrance portion.

According to this invention, and particularly for ergonomic purposes combined with practical aspects, it is highly preferable that the force to insert the rib of the first part into the cavity of the spring fastener should be less than 40 lbs, preferably less than 15 lbs, and even more preferably less that 10 lbs; the force to insert the spring fastener into the slot should be less that 30 lbs, preferably less than 15 lbs, and even more preferably less than 10 lbs; and the force to extract the spring fastener from the slot should be in the range of 30–100 lbs, and preferably in the range of 50–70 lbs.

To achieve the above results, in a preferred embodiment of this invention, the hindrance portion comprises one structure selected from ripple, side rib, upward solid bent extension parallel to the peak and the recess, knurled region, bent teeth, each having a depth, and a combination thereof.

It is preferable that the depth of the ripple, the side rib, the upward solid bent extension which is parallel to the peak, the knurled region, and the bent teeth is smaller than 0.2 mm.

It is further preferable that each ripple is in the form of a depression, the depression having a deepest part, a front side, a back side and a width, and the hindrance portion has a surface, comprises not more than three ripples, and wherein the depth of each ripple is the distance between the surface of the hindrance portion and the deepest part of the respective ripple.

It is more preferable that the hindrance portion comprises not more than two ripples, and even more preferable one ripple.

For better performance, the ripple width is larger than the depth of the ripple, and preferably the ripple width is at least twice the size of the depth of the ripple.

The ripple width is preferably in the range of 0.1 to 0.5 mm and the ripple depth is in the range of 0.01 to 0.1 mm.

In a preferred embodiment, the back side of the ripple has a slope in the range of 15 to 30 degrees with regard to the general plane of the hindrance portion, and it is also preferable that the front side has a higher slope than the back side.

In the case that the hindrance portion comprises a single ripple, it is highly preferable that the ripple has only a back side, and substantially lacks a front side. It is also highly preferable that the back side has the form of a curvature with a gradually decreasing slope. For example, the gradually decreasing slope may have the shape of an arc in the range of 50–70 degrees with a radius in the range of 0.03–0.05 mm.

The barbs are preferably selected from a group consisting essentially of:
first barbs being outer barbs and second barbs being inner barbs;
first barbs being outside outer barbs and second barbs being inside outer barbs; and
first barbs being inner barbs and second barbs being inner barbs.

It is preferable that the barbs are cut from their respective side, are flexible, and bent in the vicinity of their respective front end as described for example in U.S. Pat. No. 6,279,207 B1, which is incorporated herein by reference, and more particularly in FIG. 1 of said patent, with an angle of bent in the range of 5–25 degrees.

The barbs are considered to be flexible if they do not cause the width W3 (FIG. 1A) to increase more than 30%, preferably 20%, and more preferably 10%, when the rib 46 is inserted into the cavity 19 of the fastener 10 (FIG. 4A), and provided that the first object 46 is adequately hard to hinder the barbs 36 from substantially digging into it.

Regarding the outside outer barbs, it is preferable that their front points are at a distance from the second side smaller than the thickness of the material from which the spring fastener was made. This is to avoid interconnection of the fasteners, when said fasteners are stored in bulk.

The barbs may have variable width along their length, or they may have substantially the same width along their length. Further, the front points of the barbs may be toothed.

It is also preferable that the fastener has a width in the vicinity of the top portion of the fastener which is at least 60%, and more preferably at least 70%, as wide as the slot width.

With respect to the engagement region it is preferable that it is at least partially wider than the rest of the engagement spring.

The spring fasteners of the instant invention may have two engagement springs at the edges of each side instead of one engagement spring in substantially the middle portion of each side.

The spring fastener may further comprise additional lower barbs pointing inwardly and originating form the vicinity of the bottom portions of the first side and the second side of the fastener. In another embodiment, each side of the spring fastener has only one upper barb and one lower barb, the upper barb of one side facing the lower barb of the other side and vice versa. In still another embodiment, the fastener may further comprise a relief opening in the vicinity of the bottom of the spring fastener.

The spring fastener of the instant invention may further comprise a molded elastic body under the top portion of said spring fastener. Such arrangements are disclosed in U.S. Pat. No. 6,353,981 B1, which is incorporated herein by reference.

In another embodiment, the spring fastener of the instant invention may further comprise:
- an elastic body comprised of at least a gasket, the gasket extending away from the closed cavity in the vicinity of the top portion of the fastener and enclosing at least partially the cavity; and
- a casing surrounding at least partially the spring fastener under the top portion, except at least the engagement section of each engagement spring, the casing also at least partially surrounding the cavity and such portion of the elastic body which at least partially encloses the cavity;
- wherein the casing has lower ultimate elongation, higher Shore hardness, and higher shear strength than the elastic body.

Such arrangements are disclosed in U.S. Pat. No. 6,381,811 B2, which is incorporated herein by reference According to the present invention, any embodiments of fasteners described above and their equivalents may be used in any assembly in which the first part and the second part are connected with the fastener, as well as in any vehicle comprising such an assembly or such a fastener or its equivalents.

DESCRIPTION OF THE DRAWING.

The reader's understanding of practical implementation of preferred embodiments of the invention will be enhanced by reference to the following detailed description taken in conjunction with perusal of the drawing figures, wherein.

DETAILED DESCRIPTION OF THE INVENTION

As aforementioned, this invention relates to spring fasteners characterized by a structure having a cavity in which the rib of a first part, such as a plastic panel for example, may be engaged, and they are also suitable to be engaged reversibly in a slot of second part, such as a metal sheet or the frame of a car for example. The invention also pertains an assembly of the first and the second part as connected to each other through the fastener, as well as vehicles comprising such assemblies.

Figure 1:
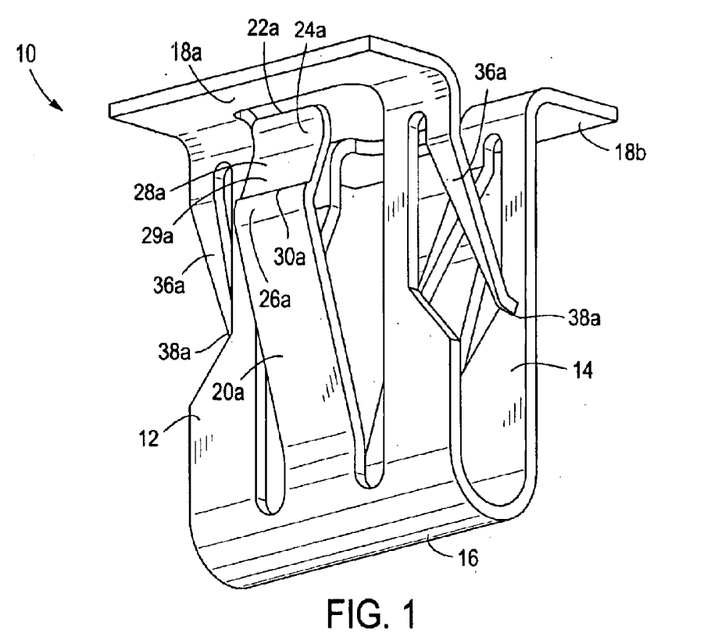
FIG. 1 illustrates a perspective view of a spring fastener according to a preferred embodiment of the present invention, wherein the hindrance portion comprises a single-sided ripple and bent barbs.
Figure 1A:
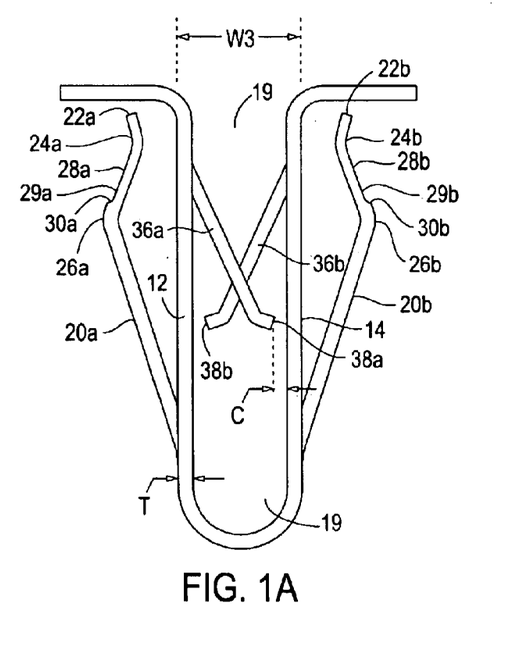
FIG. 1A shows a side view of the spring fastener of FIG. 1.

More particularly, as better shown in FIGS. 1 and 1A, the invention pertains a spring fastener 10 comprising a first side 12 and a second side 14 opposite the first side 12. The first side 12 is connected to the second side 14 forming a U-shaped structure which has a cavity 19 between the first side 12 and the second side 14. The fastener 10 also has a bottom portion 16, wherein the first side 12 and the second side 14 are connected. It further has a top portion 18a and 18b (collectively 18).

In all cases, numerals referring to the first side 12 contain the letter "a", while numerals referring the second side 14 contain the letter "b". The same numerals without the letters "a" or "b", refer collectively to the respective elements of both sides.

The first side 12 comprises first barbs 36a, which in this case are outer barbs, since they are disposed in an outer portion of the first side 12. The barbs 36a have first front ends 38a. In this particular case the first barbs 36a are bent inwardly in the vicinity of the front ends 38a, as it will be explained in more detail at a later point.

The first side 12 also comprises a first engagement spring 20a, which is connected to the first side 12 in the vicinity of the bottom portion 16.

The second side 14 comprises second barbs 36b, which in this case are inner barbs, since they are disposed in an inner portion of the second side 14. The second barbs have second front ends 38b. In this particular case the first barbs 36b are also bent inwardly in the vicinity of the front ends 38b, as it will be explained in more detail at a later point.

The second side 14 comprises a second engagement spring 20b, which is connected to the second side 14, also in the vicinity of the bottom portion.

Each of the first and second engagement springs 20a and 20b have a first and second recess, 24a and 24b, respectively, and a first and second free end, 22a and 22b, respectively, in the vicinity of the top portion 18 (18a and 18b, respectively). Each spring also comprises a first and a second peak, 26a and 26b, respectively, and a first and second engagement region, 28a and 28b, respectively, with a first and second hindrance portion, 29a and 29b, respectively, between the recesses 24 and the peaks 26.

The hindrance portions providing increased removal force, when the fastener 10 is pulled by a rib or extension 46 (FIG. 4B) of a first part 44 (FIG. 4) engaged to the first and second barbs, 36a and 36b, respectively, after the fastener 10 has been inserted into a slot 50 of a second part 48 (FIG. 4), the slot 50 having a slot width W2 (FIGS. 4 and 4C) and edges 51 (FIG. 4C) on which edges the engagement regions 28a and 28b are engaged. The increased removal force is due to the hindrance portions 29a and 29b (FIG. 4C), which in this particular case comprise single ripples with only back sides 34, as it will be explained at a later point in more detail. According to this invention, the engagement portions 28a and 28b and the hindrance regions 29a and 29b are required to be such that the fastener 10 can be extracted from the slot 50 when pulled by the rib 46 without damage to said fastener 10, and with a higher force than a force required in the absence of the hindrance portions 29a and 29b.

This invention further pertains an assembly 11, as better shown in FIG. 4B, comprising a spring fastener as described above or in the embodiments presented hereinbelow; a first part 44 (FIG. 4) comprising a rib 46 (FIG. 4A) inserted into the cavity 19 of the spring fastener 10 and engaged to the first and second barbs 36a and 36b; and a second part 48 (FIGS. 4 and 4B) comprising a slot 50, which slot 50 has a width W2 and edges 51 (FIG. 4C), so that the edges 51 of said slot are engaged to the engagement regions 28a and 28b of the spring fastener 10. In this case also, the requirement exists that by pulling the rib 46, the fastener 10 is extracted from the slot 50 without damage to the fastener 10, and with a higher force than a force required in the absence of the hindrance portions 29a and 29b.

In addition, this invention is related to a vehicle which comprises an assembly 11, as described above.

Figure 4:
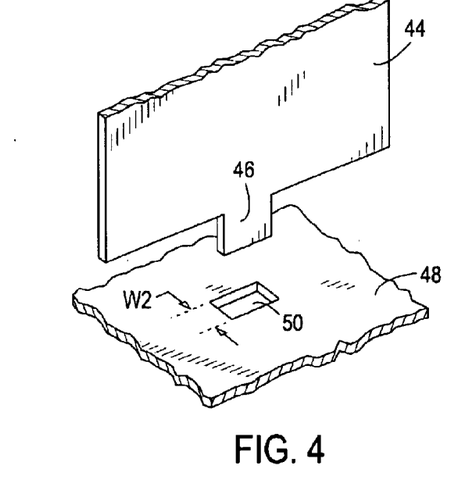
FIG. 4 illustrates two parts, which can be connected with the fastener according to the present invention.

In operation of the above embodiments, the spring fastener 10 of the present invention is intended to connect a first part, such as a panel 44 for example, which panel may have a rib 46, with a second part, such as a frame 48 of a car for example, having a slot 50, as illustrated in FIG. 4.

The rib 46 of the panel 44 is preferably first inserted into the cavity 19 of the fastener 10 (see FIG. 4A), where, it is secured by barbs 36a and 36b. Then, the fastener 10, which has been secured on the extension 46 of the panel 44, is inserted into the slot 50 of the frame 48, as better shown in FIG. 4B.

In this manner, the first part, exemplified by panel 44, has been connected on the second part, exemplified by frame 48, through the fastener 10 of the instant invention.

In most practical applications, the length Le (see FIG. 4A) of the engagement regions 28 is not higher than 2–4 mm, while the thickness $T_f$ of the frame 48 (see FIG. 4B) may vary in most occasions in the range of 0.5 to 2 mm. This fact makes it rather difficult to form large hindrance portions. Thus, The "bulbous projections" suggested by U.S. Pat. No. 6,141,837 (Wisniewski) are necessarily too bulky and voluminous, take most of the space between the "reverse bents" (engagement regions between the peak and the recess in the case of the instant invention), and unless they are manufactured within tight tolerances with regard to the thickness of the frame (which in practice may vary considerably), the "base plates" (top portions in the case of the present invention) do not sit on the frame (see also Wisniewski's Figures), rendering the structure considerably unstable.

According to this invention, and particularly for ergonomic purposes combined with practical aspects, it is highly preferable that the force to insert the rib of the first part into the cavity of the spring fastener should be less than 40 lbs, preferably less than 15 lbs, and even more preferably less that 10 lbs; the force to insert the spring fastener into the slot should be less that 30 lbs, preferably less than 15 lbs, and even more preferably less than 10 lbs; and the force to extract the spring fastener from the slot should be in the range of 30–100 lbs, and preferably in the range of 50–70 lbs.

It was unexpectedly found by the inventors that in order to achieve the above results, the hindrance portions should comprise rather minute elements, and not the huge structural components disclosed in the art. Such huge structural components render respective fasteners to be irreversibly inserted into slots. Any attempt to extract these fasteners from the side of the panel that they were inserted would result in destruction of the fasteners.

According to this invention, the hindrance portions 29a and 29b may comprise minute elements, such as ripples, upward solid bent extensions parallel to the peaks and the recesses, knurled regions, bent teeth, each having a depth, the depth of which does not exceed preferably 0.2 mm, and more preferably 0.1 mm. Any person of ordinary skill in the art would not expect that elements having such minute depths would have such great impact in force balances as the aforementioned ones.

The depth for any element is substantially defined in the same manner as defined at a later point for the ripples.

Although this invention includes any structure which satisfies the claims, such as for example upward solid bent extensions parallel to the peaks and the recesses, knurled regions, bent teeth, as described in at least one of the provisional patent applications 60/301,364, filed Jun. 25, 2001, 60/327,814, filed Oct. 9, 2001, and 60/353,515, filed Feb. 1, 2002, and as long as their depth does not exceed 0.2 mm, the most preferable configuration is one that comprises at most three ripples having a preferable depth not exceeding 0.2 mm, and more preferably not exceeding 0.1 mm. It is more preferable that the hindrance portion comprises not more than two ripples, and even more preferable one ripple. Structures with one to three two-sided ripples 30 are shown in FIGS. 3B to 3D, respectively.

Figure 2:
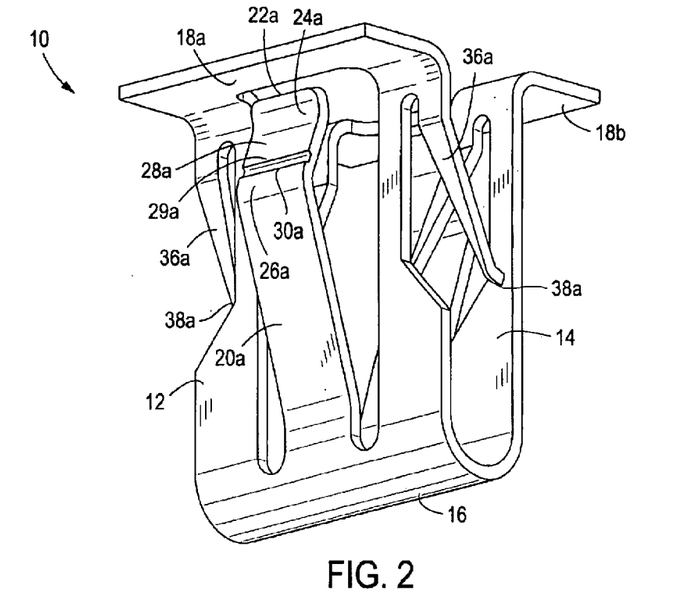
FIG. 2 illustrates a perspective view of a spring fastener according to another preferred embodiment of the present invention, wherein the hindrance portion comprises one two-sided ripple and bent barbs.

FIG. 2 illustrates a spring fastener 10 according to this invention, wherein the hindrance portion 29 comprises one two-sided ripple 30 and bent barbs 36.

Figure 3A:
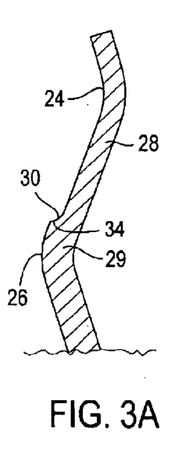
FIG. 3A illustrates a fragmental cross-sectional view of an engagement spring, wherein the hindrance portion comprises a single-sided ripple.
Figure 3B:
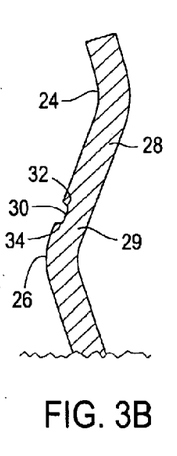
FIG. 3B illustrates a fragmental cross-sectional view of an engagement spring, wherein the hindrance portion comprises one two-sided ripple.
Figure 3C:
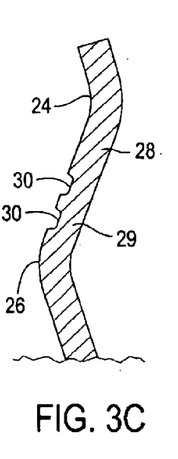
FIG. 3C illustrates a fragmental cross-sectional view of an engagement spring, wherein the hindrance portion comprises two two-sided ripples.
Figure 3D:
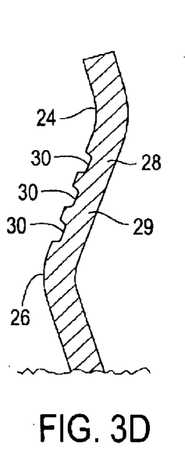
FIG. 3D illustrates a fragmental cross-sectional view of an engagement spring, wherein the hindrance portion comprises three two-sided ripples.

The most efficient and effective case, however, according to this invention, is the use of only one single-sided ripple 30, as shown for example in FIGS. 1 and 3A.

The operation of these embodiments is substantially the same as the operation of the previous embodiments.

Figures 5, 5A:
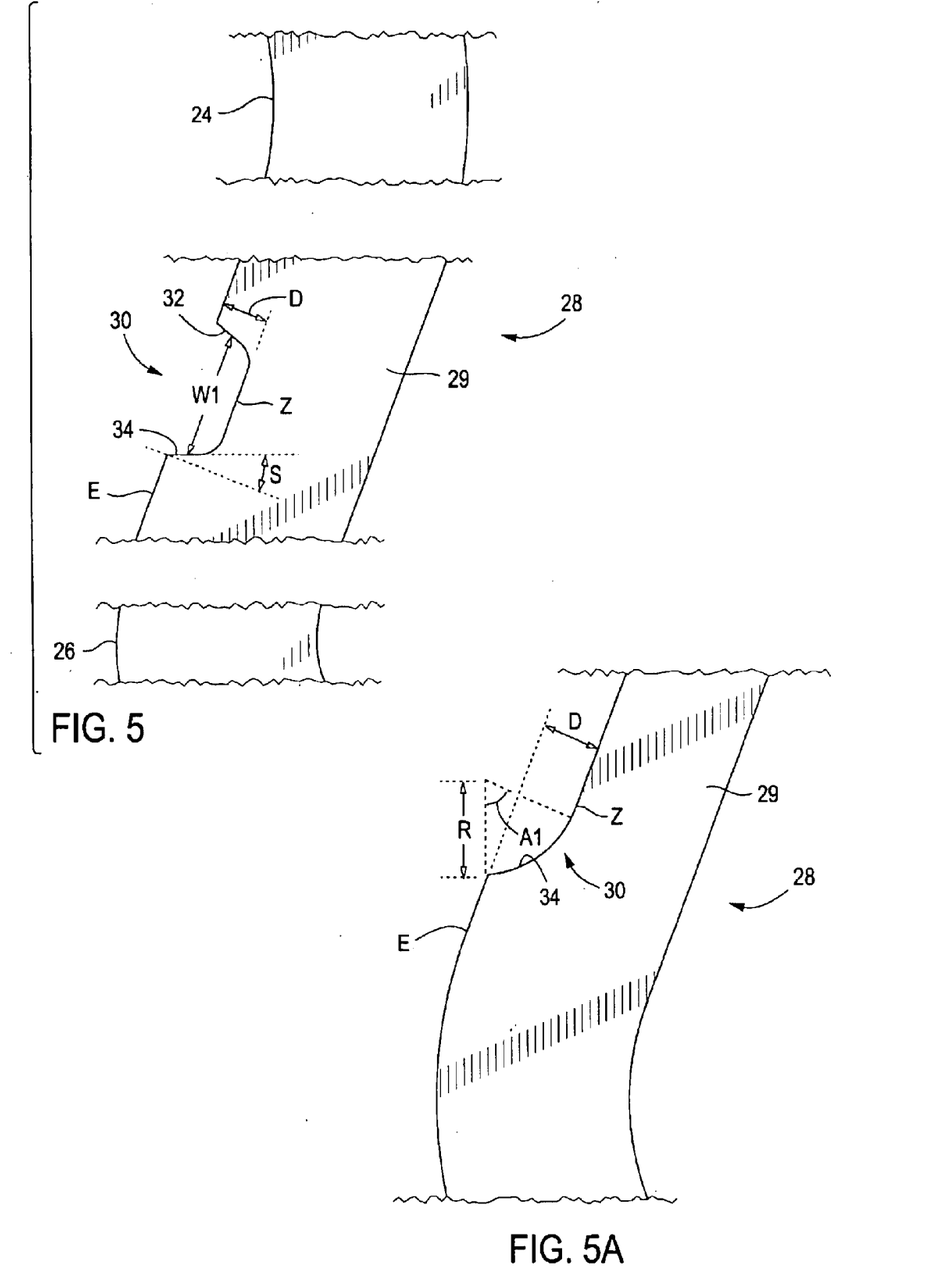
FIG. 5 illustrates a detailed diagram of a ripple in the hindrance portion according to preferred embodiments of the instant invention.
FIG. 5A illustrates a detailed diagram of a single-sided ripple having a back side in the form of a curvature in the hindrance portion according to a highly preferred embodiment of the instant invention.

It is preferable that each ripple 30 is in the form of a depression, as better shown in FIG. 5. The depression has a deepest part Z, a front side 32, a back side 34, and a width W1. The hindrance portion 29 has a surface E, and the depth D of each ripple 30 is defined as the distance between the surface E of the hindrance portion 29 and the deepest part Z of the respective ripple 30.

For better performance, the ripple width is larger than the depth of the ripple, and preferably the ripple width is at least twice the size of the depth of the ripple. The ripple width is preferably in the range of 0.1 to 0.5 mm and the ripple depth is in the range of 0.01 to 0.1 mm, as aforementioned.

In a preferred embodiment, the back side 34 of the ripple 30 is substantially linear and has a slope S in the range of 15 to 30 degrees with regard to the general plane of the surface E of the hindrance portion 29, and it is also preferable that the front side 32 has a higher slope than the back side. The slope of the front side is measured in the same manner as the slope of the back side. Thus, if the front side 32 is substantially perpendicular to the surface E, the slope is substantially 0 degrees, while if the front side 32 is substantially parallel to the plane of surface E and the continuation of the deepest part Z, it is substantially 90 degrees.

It is, however, highly preferable that the back side 34 has the form of a curvature with a gradually decreasing slope. For example, the gradually decreasing slope of back side 34 may have the shape of an arc corresponding to an angle A1, preferably in the range of 50–70 degrees, with a radius R, preferably in the range of 0.03–0.05 mm., as better shown in FIG. 5A.

This configuration is of extreme importance in most occasions, because during vibrations, the edges 51 of the slot 50 (FIG. 4C) slide smoothly on the engagement regions 28 as well as the hindrance portions 29 during operation, and when they reach the back sides 34 of the single-sided ripples 30 (FIG. 5A), they continue sliding smoothly finding increasingly higher resistance in a continuous manner, which eliminates any rattling noises. Such rattling noises would be present in a case that the edges 51 would hit abrupt obstacles or would suddenly jump down, even without hitting such obstacles.

Figure 6:
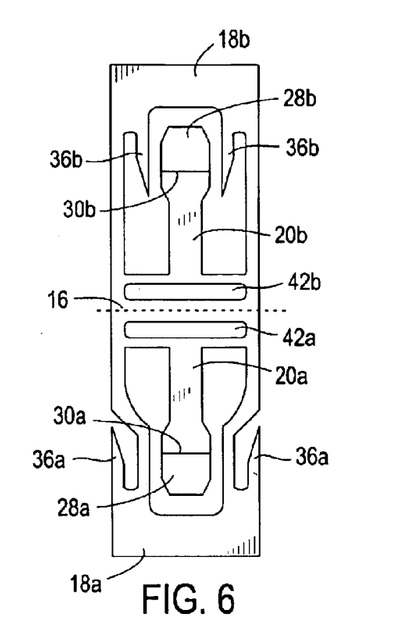
FIG. 6 illustrates a stamped fastener before final formation according to another embodiment of the present invention, wherein the fastener comprises outer and inner barbs, as well as relief portions in the vicinity of the bottom of the fastener.
Figure 6A:
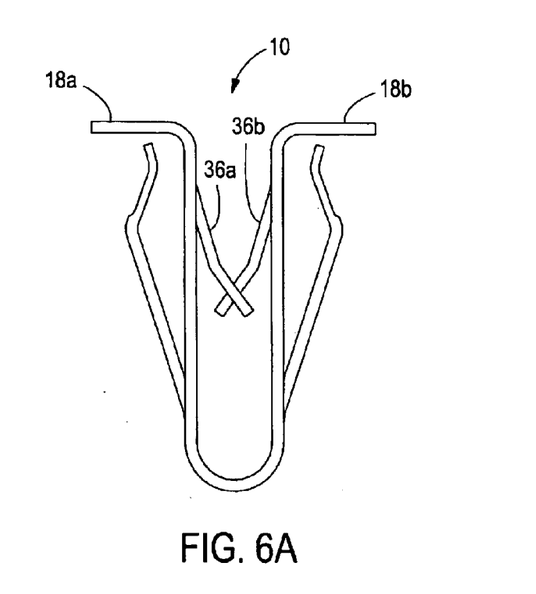
FIG. 6A illustrates a side view of the fastener of FIG. 6 after final formation.
Figure 7:
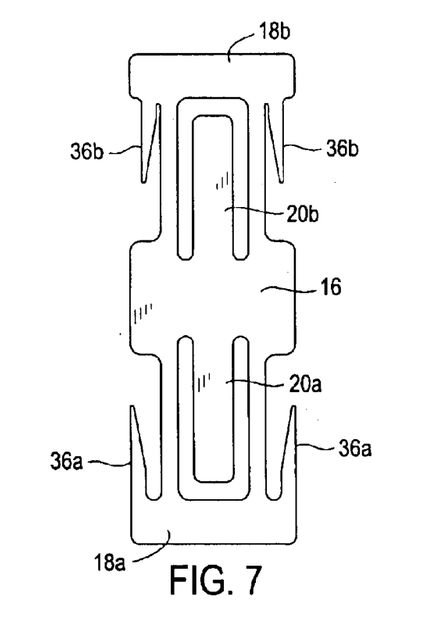
FIG. 7 illustrates a stamped fastener before final formation according to another embodiment of the present invention, wherein the fastener comprises outside outer barbs on the first side and inside outer barbs on the second side.
Figure 8:
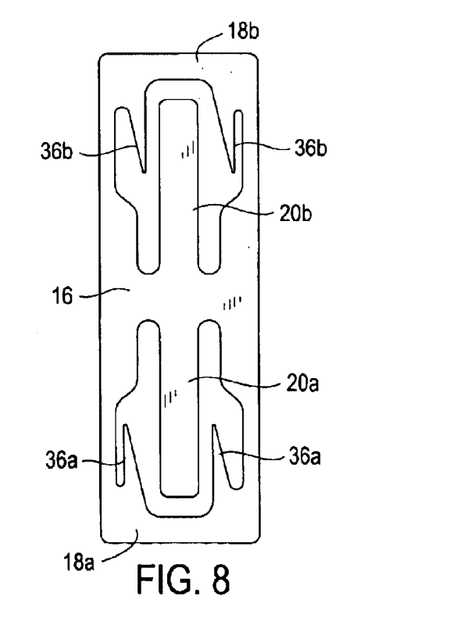
FIG. 8 illustrates a stamped fastener before final formation according to another embodiment of the present invention, wherein the fastener comprises only inner barbs.

The barbs are preferably selected from a group consisting essentially of:

first barbs 36a being outer barbs, and second barbs 36b being inner barbs, as better shown in FIGS. 6 (blank before forming) and 6A (side view);

first barbs 36a being outside outer barbs, and second barbs 36b being inside outer barbs, as better shown in FIG. 7 (blank before forming); and first barbs 36a being inner barbs, and second barbs 36b being inner barbs, as better shown in FIG. 8 (blank before forming).

In operation, the barbs engage on the rib 46 of the first part 44, and when an adequate pulling force is applied on the firs part 44, the fastener remains on said first part 44, but is extracted from the slot 50.

The spring fastener 10 may also comprise relief openings 42a and 42b in the vicinity of the bottom 16 of the spring fastener 10, as better shown in FIG. 6 (blank before forming). These relief openings facilitate the insertion of the fastener into the slot 50.

Figure 9:
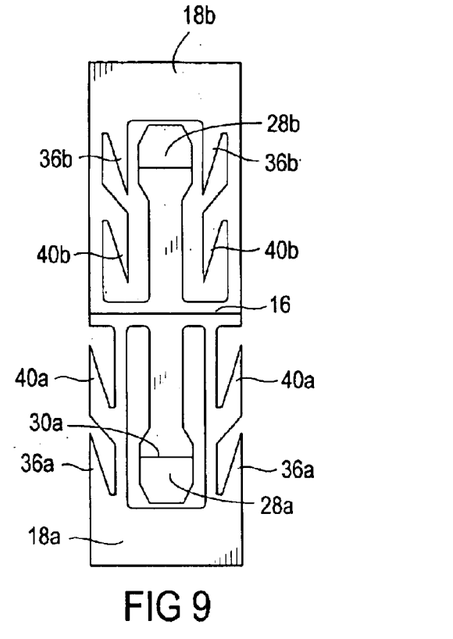
FIG. 9 illustrates a stamped fastener before final formation according to another embodiment of the present invention, wherein the fastener comprises upper and lower outer and inner barbs.

The spring fastener 10 may further comprise additional lower barbs 40a and 40b pointing inwardly and originating form the vicinity of the bottom portion 16 of the first side and the second side, respectively, of the fastener 10, as better shown in FIG. 9 (blank before forming).

Figure 10:
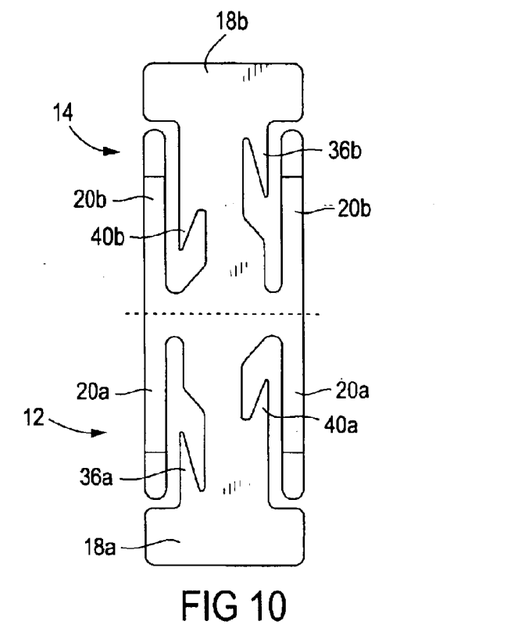
FIG. 10 illustrates a stamped fastener before final formation according to another embodiment of the present invention, wherein the fastener comprises two engagement springs per side of the fastener, and only one upper and one lower barb per side.

In another embodiment, better illustrated in FIG. 10 (blank before forming), the first side of the spring fastener 10 has only one upper barb 36a and one lower barb 40a, while the second side also has also only one upper barb 36b and only one lower barb 40b, in a manner that the upper barb of one side faces the lower barb of the other side and vice versa.

Figure 11:
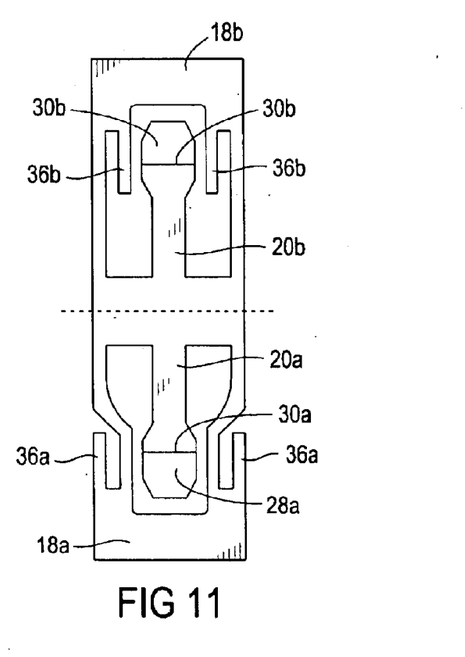
FIG. 11 illustrates a stamped fastener before final formation according to another embodiment of the present invention, wherein the barbs have uniform width along their length.
Figure 12:
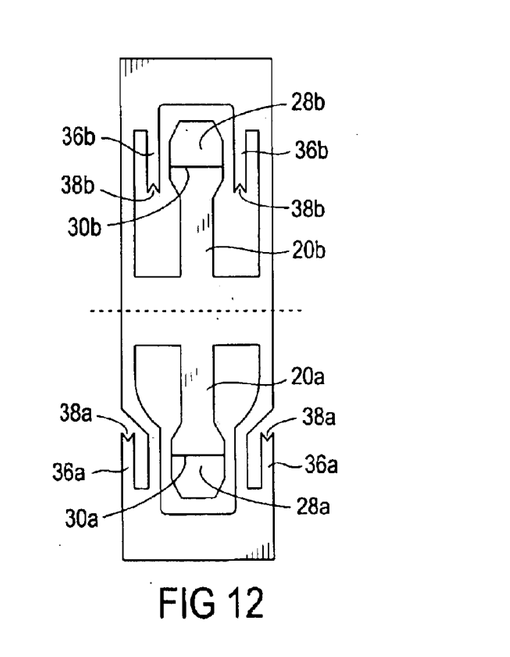
FIG. 12 illustrates a stamped fastener before final formation according to another embodiment of the present invention, wherein the barbs have uniform width along their length, and they are toothed at their front ends.

The barbs 36 may have variable width along their length, as illustrated in for example in FIGS. 6–10, or they may have substantially the same width along their length as better shown in FIG. 11. Further, the front points of the barbs 36 may be toothed, as illustrated in FIG. 12.

Regarding outside outer barbs 36, it is preferable that their front points 38 are at a distance C from the second side 14 smaller than the thickness T of the material from which the spring fastener 10 is made, as better shown in FIG. 1A. This is to avoid interconnection of the fasteners, when said fasteners are stored in bulk.

It is preferable that the barbs are cut from their respective side, are flexible, and bent in the vicinity of their respective front end as described for example in U.S. Pat. No. 6,279, 207 B1, which is incorporated herein by reference, and more particularly in FIG. 1 of said patent, with an angle of bent in the range of 5–25 degrees.

Figures 4A, 4C:
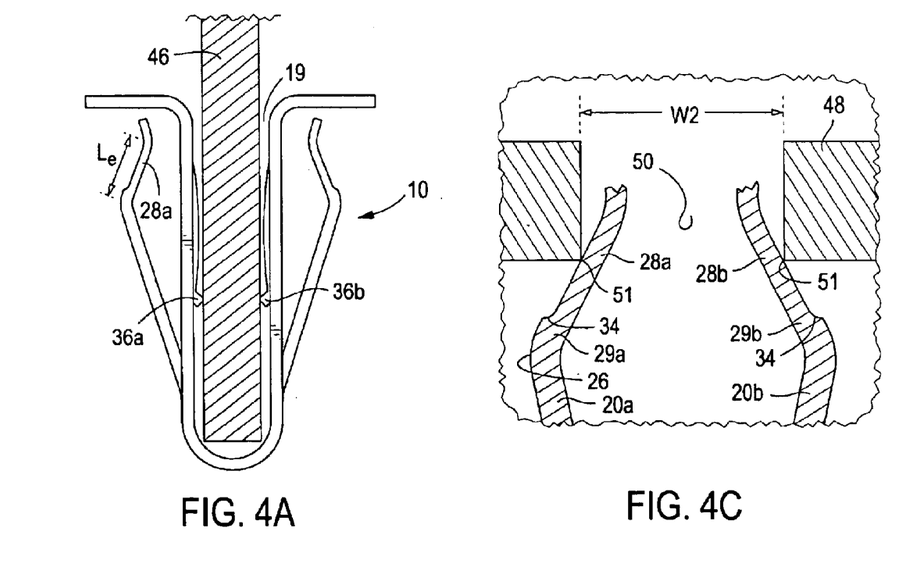
FIG. 4A illustrates the side view of the fastener of FIG. 1 and a cross section of the rib of a first part, such as a panel for example, inserted into the cavity of the fastener.
FIG. 4C illustrates a fragmental cross section of the second part of FIG. 4B and the edges of the slot in relation with the engagement regions of the engagement springs of the fastener.
Figure 4B:
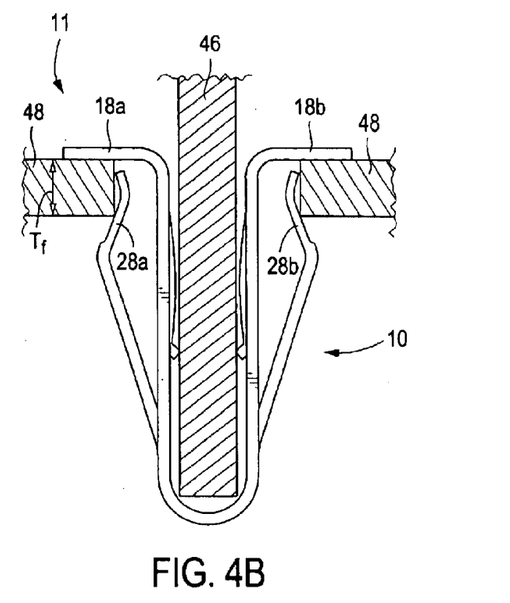
FIG. 4B illustrates the same elements shown in FIG. 4A after insertion of the fastener into the slot of a second part, such as the frame of an automobile for example.

It is also preferable that the fastener 10 has a width W3 (FIG. 1A) in the vicinity of the top portion 18 of the fastener 10, which is at least 60%, and more preferably at least 70%, as wide as the slot width W2 (FIG. 4C). Thus, it is preferable that the whole fastener complies with this requirement, or at least a portion in the vicinity of the top. This is to avoid reversal of the direction and failure of the barbs 36, when and if the rib 46 is forcefully pulled away from the second part 48 (FIG. 4B).

With respect to the engagement regions 28, it is preferable that these regions are at least partially wider than the rest of the respective engagement springs 20 (see for example FIG. 6).

The more barbs are present, or the more bent their front points are, the stronger the engagement of the rib 46 in the cavity 19. However, in many occasions it is desirable that this engagement is not so strong so as to destroy the integrity of the fastener or the rib, when an adequate force is applied to separate the fastener 10 from the rib 46.

The spring fasteners 10 of the instant invention may have two engagement springs 20 at the edges of each side instead of one engagement spring 20 in substantially the middle portion of each side (see for Example FIG. 10).

Figure 13:
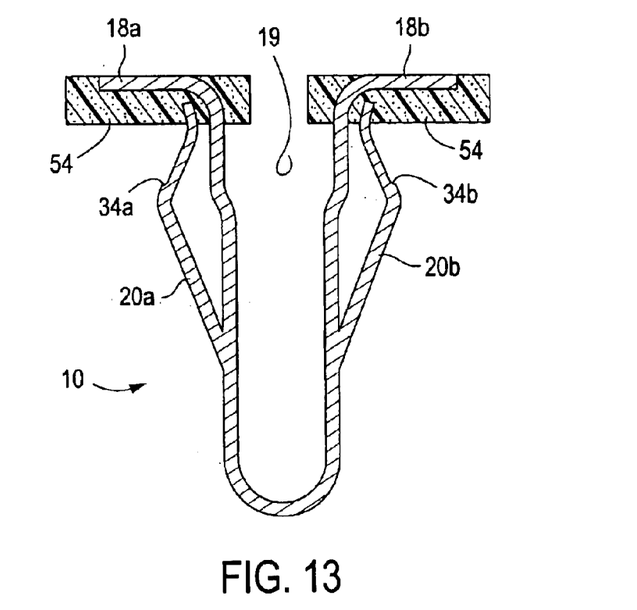
FIG. 13 illustrates a cross-sectional view of the middle portion of a spring fastener, according to another embodiment of the instant invention, wherein a molded elastic body 54 is disposed at least under the top portion of said spring fastener.

The spring fastener 10 of the instant invention may further comprise a molded elastic body 54 at least under the top portion 18 of said spring fastener 10, as better shown in FIG. 13. Such arrangements are disclosed in U.S. Pat. No. 6,353,981 B1, which is incorporated herein by reference.

The operation of this embodiment is similar to the operation of the previously described embodiments with the difference that the elastic body provides moderate sealing properties to the fastener when the fastener is inserted into the slot.

Figure 14:
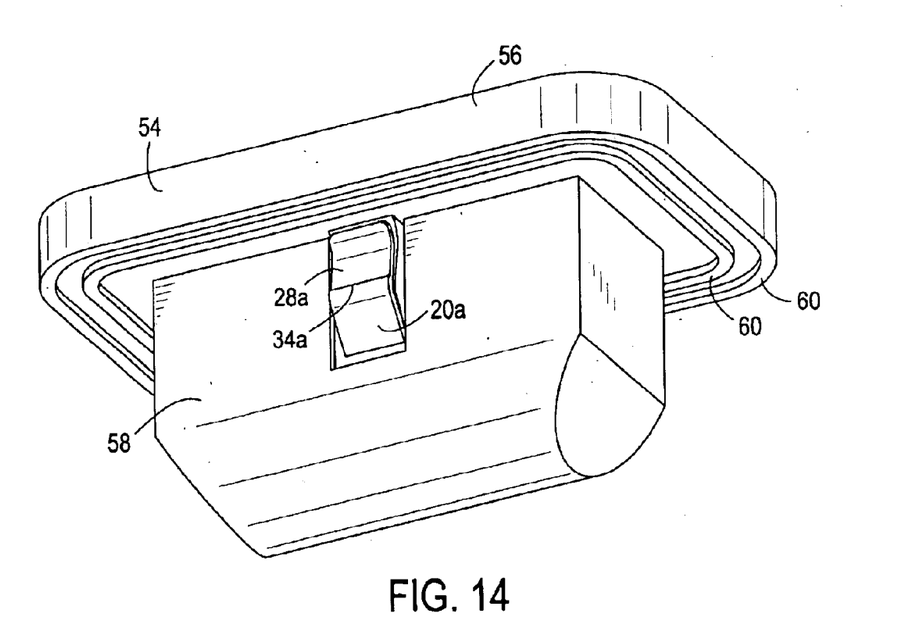
FIG. 14 is a perspective view of a fastener, according to still another embodiment of the instant invention, wherein the lower portion of the fastener is covered by a casing, while an elastic body is disposed in the vicinity of the top portion and encloses the cavity, at least partially

In another embodiment, the spring fastener of the instant invention may further comprise:

an elastic body 54 comprised of at least a gasket 56, the gasket 56 extending away from the closed cavity 19 in the vicinity of the top portion 18 of the fastener 10 and enclosing at least partially the cavity 19; and a casing 58 surrounding at least partially the spring fastener under the top portion 18, except at least the engagement region 28 of each engagement spring 20, the casing 58 also at least partially surrounding the cavity 19 and such portion of the elastic body 54 which at least partially encloses the cavity;

wherein the casing 58 has lower ultimate elongation, higher Shore hardness, and higher shear strength than the elastic body 54;

as better shown in FIG. 14.

The presence of lips 60 improves considerably the sealing properties of the elastic body.

Such arrangements are also disclosed in U.S. Pat. No. 6,381,811 B2, which is incorporated herein by reference.

The operation of this embodiment is similar to the operation of the previously described embodiments with the difference that the combination of the elastic body 54 with the casing 58 provide outstanding sealing properties to the fastener 10 when the fastener 10 is inserted into the slot 50, and the casing itself facilitates the insertion of the fastener 10 into the slot 50.

According to the present invention, any embodiments of fasteners described above and their equivalents may be used in any assembly in which the first part and the second part are connected with the fastener, as well as in any vehicle comprising such an assembly or such a fastener or its equivalents.

It should also be understood that the miscellaneous embodiments and features of the instant invention may be used in any combination or by themselves in other articles or devices, where they may be needed.

Examples of embodiments demonstrating the operation of the instant invention, have been given for illustration purposes only, and should not be construed as restricting the scope or limits of this invention in any way.

What is claimed is:

1. A spring fastener comprising a first side and a second side opposite the first side, the first side connected to the second side thereby forming a U-shaped structure having a cavity between the first side and the second side, a bottom portion wherein the first side and the second side are connected, and a top portion, the first side comprising first barbs having first front ends, and a first engagement spring, the first engagement spring connected to the first side in the vicinity of the bottom portion, the second side comprising second barbs second front ends, and a second engagement spring, the second engagement spring connected to the second side in the vicinity of the bottom portion, each of the first and second engagement springs having a recess and a free end in the vicinity of the top portion, each spring also comprising a peak and an engagement region with a hindrance portion between the recess and the peak, the hindrance portion comprising one structure selected from ripple, side rib, upward solid bent extension parallel to the peak and the recess, knurled region, bent teeth, each having a depth, and a combination thereof, and providing increased removal force, when the fastener is pulled by a rib of a first part engaged to the first and second barbs, after the fastener has been inserted into a slot of a second part, the slot having a slot width and edges on which edges the engagement region is engaged, the increased removal force being due to the hindrance portion, and wherein the fastener can be extracted when pulled by the rib without damage to said fastener.

2. A spring fastener as defined in claim 1, wherein the depth of the ripple, the side rib, the upward solid bent extension which is parallel to the peak, the knurled region, and the bent teeth is smaller than 0.2 mm.

3. A spring fastener as defined in claim 1, wherein each ripple has the form of a depression, the depression having a deepest part, a front side, a back side and a width, and the hindrance portion has a surface, comprises not more than three ripples, and wherein the depth of each ripple is the distance between the surface of the hindrance portion and the deepest part of the respective ripple.

4. A spring fastener as defined in claim 3, wherein hindrance portion comprises not more than two ripples.

5. A spring fastener as defined in claim 4, wherein the hindrance portion comprises only one ripple.

6. A spring fastener as defined in claim 5, wherein the ripple width is larger than the depth of the ripple.

7. A spring fastener as defined in claim 6, wherein the ripple width is at least twice the size of the depth of the ripple.

8. A spring fastener as defined in claim 6, wherein the ripple width is in the range of 0.1 to 0.5 mm and the ripple depth is in the range of 0.01 to 0.1 mm.

9. A spring fastener as defined in claim 3, wherein the back side has a slope in the range of 15 to 30 degrees with regard to the general plane of the hindrance portion.

10. A spring fastener as defined in claim 3, wherein the front side has a higher slope than the back side.

11. A spring fastener as defined in claim 5, wherein the ripple has only a back side, substantially lacking a front side.

12. A spring fastener as defined in claim 11, wherein the back side has the form of a curvature with a gradually decreasing slope.

13. A spring fastener as defined in claim 12, wherein the gradually decreasing slope has the shape of an arc in the range of 50–70 degrees with a radius in the range of 0.03–0.05 mm.

14. A spring fastener as defined in claim 1, wherein the barbs are selected from a group consisting essentially of:
   first barbs being outer barbs and second barbs being inner barbs;
   first barbs being outside outer barbs and second barbs being inside outer barbs; and
   first barbs being inner barbs and second barbs being inner barbs.

15. A spring fastener as defined in claim 3, wherein the barbs are selected from a group consisting essentially of:
   first barbs being outer barbs and second barbs being inner barbs;
   first barbs being outside outer barbs and second barbs being inside outer barbs; and
   first barbs being inner barbs and second barbs being inner barbs.

16. A spring fastener as defined in claim 11, wherein the barbs are selected from a group consisting essentially of:
   first barbs being outer barbs and second barbs being inner barbs;
   first barbs being outside outer barbs and second barbs being inside outer barbs; and
   first barbs being inner barbs and second barbs being inner barbs.

17. A spring fastener as defined in claim 12, wherein the barbs are selected from a group consisting essentially of:
   first barbs being outer barbs and second barbs being inner barbs;
   first barbs being outside outer barbs and second barbs being inside outer barbs; and
   first barbs being inner barbs and second barbs being inner barbs.

18. A spring fastener as defined in claim 14, wherein at least one barb is cut from its respective side, flexible, and bent at its respective front end.

19. A spring fastener as defined in claim 15, wherein at least one barb is cut from its respective side, flexible, and bent at its respective front end.

20. A spring fastener as defined in claim 16, wherein at least one barb is cut from its respective side, flexible, and bent at its respective front end.

21. A spring fastener as defined in claim 17, wherein at least one barb is cut from its respective side, flexible, and bent at its respective front end.

22. A spring fastener as defined in claim 14, wherein the material from which the spring fastener has a thickness, and the front points of the outside outer barbs are at a distance from the second side smaller than the thickness of said material.

23. A spring fastener as defined in claim 17, wherein the material from which the spring fastener has a thickness, and the front points of the outside outer barbs are at a distance from the second side smaller than the thickness of said material.

24. A spring fastener as defined in claim 21, wherein the material from which the spring fastener has a thickness, and the front points of the outside outer barbs are at a distance from the second side smaller than the thickness of said material.

25. A spring fastener as defined in claim 1, wherein the fastener has a width in the vicinity of the top portion of the fastener which is at least 60% as wide as the slot width.

26. A spring fastener as defined in claim 1, wherein the engagement region is at least partially wider than the rest of the engagement spring.

27. A spring fastener as defined in claim 3, wherein the engagement region is at least partially wider than the rest of the engagement spring.

28. A spring fastener as defined in claim 11, wherein the engagement region is at least partially wider than the rest of the engagement spring.

29. A spring fastener as defined in claim 12, wherein the engagement region is at least partially wider than the rest of the engagement spring.

30. A spring fastener as defined in claim 1, further comprising additional lower barbs pointing inwardly and originating form the vicinity of the bottom portions of the first side and the second side of the fastener.

31. A spring fastener as defined in claim 1, wherein each side of the spring fastener has only one upper barb and one lower barb, the upper barb of one side facing the lower barb of the other side and vice versa.

32. A spring fastener as defined in claim 1, further comprising a relief opening in the vicinity of the bottom of the spring fastener.

33. A fastener as defined in claim 1, wherein
   a force to insert the rib of the first part into the cavity of the spring fastener is less than 40 lbs;
   a force to insert the spring fastener into the slot of the second part is less that 30 lbs; and
   a force to extract the spring fastener from the slot is in the range of 30–100 lbs.

34. A spring fastener as defined in claim 1, further comprising a molded elastic body under the top portion of said spring fastener.

35. A spring fastener as defined in claim 1, further comprising:
   an elastic body comprised of at least a gasket, the gasket extending away from the closed cavity in the vicinity of the top portion of the fastener and enclosing at least partially the cavity;
   a casing surrounding at least partially the spring fastener under the top portion, except at least the engagement section of each engagement spring, the casing also at least partially surrounding the cavity and such portion of the elastic body which at least partially encloses the cavity;
   wherein the casing has lower ultimate elongation, higher Shore hardness, and higher shear strength than the elastic body.

* * * * *